(12) United States Patent
Lee et al.

(10) Patent No.: US 8,595,954 B2
(45) Date of Patent: Dec. 3, 2013

(54) CLOTHES TREATING APPARATUS WITH HEAT PUMP SYSTEM AND OPERATING METHOD THEREOF

(75) Inventors: Hyuksoo Lee, Seoul (KR); Sungmin Ye, Seoul (KR); Byeongjo Ryoo, Seoul (KR)

(73) Assignee: LG Electronics Inc., Seoul (KR)

( * ) Notice: Subject to any disclaimer, the term of this patent is extended or adjusted under 35 U.S.C. 154(b) by 217 days.

(21) Appl. No.: 13/247,530

(22) Filed: Sep. 28, 2011

(65) Prior Publication Data
US 2012/0079735 A1    Apr. 5, 2012

(30) Foreign Application Priority Data

Sep. 30, 2010 (KR) .................. 10-2010-0095486

(51) Int. Cl.
*F26B 19/00*    (2006.01)

(52) U.S. Cl.
USPC ............... 34/487; 34/565; 34/595; 34/606; 62/621; 60/39.19; 68/5 C; 8/158

(58) Field of Classification Search
USPC .......... 34/380, 381, 413, 487, 497, 565, 595, 34/601, 602, 606; 62/617, 618, 621; 60/39.15, 39.19; 68/3 R, 4, 5 C, 19, 20; 8/137, 158
See application file for complete search history.

(56) References Cited

U.S. PATENT DOCUMENTS

| | | | | |
|---|---|---|---|---|
| 2,430,692 A * | 11/1947 | Touborg | ............................ | 62/474 |
| 2,627,669 A * | 2/1953 | Candor | ............................ | 34/547 |
| 3,122,908 A * | 3/1964 | Stanulis et al. | .............. | 68/12.09 |
| 3,161,232 A * | 12/1964 | Bishop | ............................ | 165/62 |
| 3,404,542 A * | 10/1968 | Fineblum | ..................... | 62/324.6 |
| 5,333,677 A * | 8/1994 | Molivadas | ..................... | 165/272 |
| 7,665,225 B2 * | 2/2010 | Goldberg et al. | ................. | 34/73 |
| 8,490,437 B2 * | 7/2013 | Kawabata et al. | .............. | 68/3 R |
| 2006/0179676 A1 * | 8/2006 | Goldberg et al. | ................. | 34/77 |
| 2010/0089062 A1 * | 4/2010 | Cao | ................................ | 60/682 |
| 2010/0107703 A1 * | 5/2010 | Hisano et al. | ..................... | 68/20 |
| 2010/0281915 A1 * | 11/2010 | Roberts et al. | ................... | 62/612 |
| 2011/0036308 A1 * | 2/2011 | Betzer-Zilevitch | .......... | 122/5.52 |
| 2011/0265523 A1 * | 11/2011 | Bison et al. | ...................... | 68/20 |
| 2012/0030960 A1 * | 2/2012 | Ryoo et al. | ......................... | 34/86 |
| 2012/0079735 A1 * | 4/2012 | Lee et al. | ........................ | 34/443 |

(Continued)

FOREIGN PATENT DOCUMENTS

| | | | | |
|---|---|---|---|---|
| DE | 4330456 C1 * | 3/1995 | ............. | D06F 58/20 |
| EP | 999302 A1 * | 5/2000 | ............. | D06F 58/20 |

(Continued)

*Primary Examiner* — Steve M Gravini
(74) *Attorney, Agent, or Firm* — Birch, Stewart, Kolasch & Birch, LLP

(57) ABSTRACT

A clothes treating apparatus includes a drum, an air suction unit forming a flow path of air introduced into the drum, an air exhaustion unit forming a flow path of air exhausted from the drum, a condenser heating air sucked into the drum through the air suction unit, an evaporator cooling air exhausted from the drum through the air exhaustion unit, a compressor compressing refrigerant introduced from the evaporator, and a variable expander expanding a refrigerant introduced from the condenser, and having a variable open degree. An operation method includes measuring a temperature of a refrigerant into the evaporator, and a temperature of a refrigerant into the compressor, and decreasing an open degree of the variable expander when a temperature difference between the two measured temperatures is less than a predetermined first value.

20 Claims, 4 Drawing Sheets

(56) References Cited

U.S. PATENT DOCUMENTS

| | | | |
|---|---|---|---|
| 2012/0079736 A1* | 4/2012 | Lee et al. | 34/476 |
| 2012/0079737 A1* | 4/2012 | Lee et al. | 34/487 |
| 2012/0246960 A1* | 10/2012 | Lee et al. | 34/86 |
| 2013/0074542 A1* | 3/2013 | Mehrpooya et al. | 62/621 |
| 2013/0098121 A1* | 4/2013 | Moon et al. | 68/5 C |
| 2013/0122432 A1* | 5/2013 | Ghoniem et al. | 431/2 |

FOREIGN PATENT DOCUMENTS

| | | | | |
|---|---|---|---|---|
| JP | 10192593 A | * | 7/1998 | D06F 58/02 |
| JP | 2007-82588 A | | 4/2007 | |
| JP | 2007136054 A | * | 6/2007 | |
| JP | 2008000226 A | * | 1/2008 | |
| JP | 2008088919 A | * | 4/2008 | |
| JP | 2009-228953 A | | 10/2009 | |
| JP | 2010-046297 A | | 3/2010 | |
| JP | 2010-075496 A | | 4/2010 | |
| JP | 2010-131262 A | | 6/2010 | |
| JP | 2011167574 A | * | 9/2011 | |
| KR | 10-2009-0105082 A | | 10/2009 | |

\* cited by examiner

CLOTHES TREATING APPARATUS WITH HEAT PUMP SYSTEM AND OPERATING METHOD THEREOF

TECHNICAL FIELD

The present invention relates to a clothes treating apparatus with a heat pump and an operating method thereof, and more particularly, to an apparatus and method capable of detecting an operation state of a heat pump system of a clothes treating apparatus, and capable of allowing the heat pump system to maintain a steady state.

BACKGROUND ART

Generally, a clothes treating apparatus having a drying function, such as a washing machine or a clothes dryer, serves to dry laundry having been completely washed and dehydrated, by introducing the laundry into a drum, by supplying hot blast into the drum, and then by evaporating moisture from the laundry.

Hereinafter, the clothes treating apparatus will be explained with taking a clothes dryer as an example. The clothes dryer includes a drum rotatably installed in a body and having laundry introduced thereinto, a driving motor configured to drive the drum, a blowing fan configured to blow air into the drum, and a heating means configured to heat air introduced into the drum. The heating means may use high-temperature electric resistance heat generated from an electric resistance, or combustion heat generated from gas combustion.

Air exhausted from the drum is in a state of a middle temperature and a high humidity due to moisture of the laundry inside the drum. According to a method for processing the air of a middle temperature and a high humidity, the clothes dryer may be classified into a condensation type (circulation type) and an exhaustion type. The condensation type clothes dryer is configured to condense moisture included in the air of a middle temperature and a high humidity, by circulating and cooling the air into a temperature less than a dew point through a condenser, without exhausting the air to the outside. And, the exhaustion type clothes dryer is configured to directly exhaust the middle temperature-high humidity air having passed through the drum to the outside.

In the case of the condensation type clothes dryer, the air has to be cooled into a temperature less than a dew point so as to condense the air exhausted from the drum. And, the air has to be heated by the heating means before being re-supplied into the drum. Here, the air may have the loss of its thermal energy while being cooled. In order to heat the air to a temperature high enough to perform a drying process, required is an additional heater, etc.

In the case of the exhaustion type clothes dryer, it is also required to exhaust the air of a middle temperature and a high humidity to the outside, to introduce external air of a high temperature, and to heat the external air into a desired temperature by the heating means. Especially, high-temperature air exhausted to the outside includes thermal energy transmitted by the heating means. However, the thermal energy is exhausted to the outside, resulting in lowering of the thermal efficiency.

In order to overcome these problems, being proposed is a clothes treating apparatus capable of enhancing the energy efficiency by collecting energy required to generate hot blast, and energy exhausted to the outside without being used. As one example of the clothes treating apparatus, a clothes treating apparatus having a heat pump system is being recently introduced. The heat pump system is provided with two heat exchangers, a compressor and an expander, and enhances the energy efficiency by collecting energy of exhausted hot blast and by re-using the energy to heat air supplied into the drum.

More concretely, the heat pump system is provided with an evaporator at an exhaustion side, and with a condenser at a suction side near the drum. And, the heat pump system transmits thermal energy to a refrigerant through the evaporator, and transmits thermal energy of the refrigerant to air introduced into the drum through the condenser, thereby generating hot blast with using abandoned energy. Here, the heat pump system may further include a heater configured to re-heat air heated while passing through the condenser.

This heat pump system has to maintain a steady state during a drying process so as to enhance the energy efficiency. Accordingly, a state of the heat pump system has to be continuously checked, and each component has to be controlled based on the checked state of the heat pump system so as to maintain a steady state.

DISCLOSURE OF THE INVENTION

Therefore, an object of the present invention is to provide a clothes treating apparatus capable of checking a state of a heat pump system and maintaining a steady state.

Another object of the present invention is to provide a method for operating a clothes treating apparatus capable of checking a state of a heat pump system and maintaining a steady state.

To achieve these and other advantages and in accordance with the purpose of the present invention, as embodied and broadly described herein, there is provided a method for operating a clothes treating apparatus comprising: a drum configured to accommodate therein an object to be dried; an air suction means configured to form a flow path of air introduced into the drum; an air exhaustion means configured to form a flow path of air exhausted from the drum; a condenser disposed to heat air sucked into the drum through the air suction means; an evaporator disposed to cool air exhausted from the drum through the air exhaustion means; a compressor configured to compress a refrigerant introduced from the evaporator; and a variable expander configured to expand a refrigerant introduced from the condenser, and having a variable open degree, the method comprising: measuring a temperature (Tei) of a refrigerant introduced into the evaporator, and a temperature (Tci) of a refrigerant introduced into the compressor; checking an open degree of the variable expander when a temperature difference (Tci−Tei) between the two measured temperatures is less than a predetermined first value; and decreasing the open degree of the variable expander according to a level of the open degree of the variable expander, wherein in the step of decreasing the open degree of the variable expander, an open degree decrease width when the open degree is small is narrower than that when the open degree is large.

In the present invention, the heat pump system may be controlled so as to stably maintain a steady state, by controlling a refrigerant flow amount by changing an open degree of the variable expander. In case of a clothes treating apparatus having a drying function, the amount of heat transmitted into the heat pump system from the evaporator may be greatly variable according to the amount of laundry accommodated in the drum and a laundry humidity. Therefore, the variable expander may need to be controlled in correspondence to a progress rate of a drying process.

More concretely, a refrigerant may be introduced into the compressor via the evaporator in a gas state not a liquid state, in the aspect of an operation condition and lifespan of the compressor. For this, a sufficient amount of heat may be transmitted to the evaporator. However, if a sufficient amount of heat cannot be transmitted to the evaporator, a flow amount of a refrigerant passing through the evaporator may be decreased such that the refrigerant is sufficiently vaporized.

Heat transmitted to the refrigerant from the evaporator may be acquired from exhaust air exhausted from the drum. However, the amount of heat transmitted to the evaporator by the exhaust air may be variable according to a progress rate of a drying process. More concretely, during an initial drying process, exhaust air may absorb a large amount of moisture from laundry thus to have a high humidity and a low temperature. Therefore, most parts of thermal energy of the exhaust air may be implemented in the form of latent heat, and only part thereof may be implemented in the form of sensible heat. This may cause the amount of heat which can be acquired by the evaporator to be relatively small. Therefore, once it is checked that the refrigerant has not been sufficiently vaporized during an initial drying process, a flow amount of the refrigerant passing through the evaporator has to be rapidly decreased.

More concretely, during an initial drying process, sensitivity to refrigerant vaporization with respect to a change of the open degree of the variable expander may be low. Accordingly, it is preferable to sufficiently increase a change width of the open degree.

On the other hand, once the drying process has performed to some degree, the amount of moisture included in the laundry may become small. Since energy of exhaust air is implemented in the form of sensible heat, the amount of heat transmitted to the refrigerant through the evaporator may become relatively large. In this case, differently from the initial drying process, sensitivity to refrigerant vaporization with respect to a change of an open degree of the variable expander may be high. Accordingly, it may be preferable to decrease a change width of the open degree for the energy efficiency of the clothes treating apparatus.

In the present invention, the refrigerant vaporization may be checked by using a change of each quantity of state of a refrigerant introduced into the compressor, and a refrigerant introduced into the evaporator. For instance, the refrigerant vaporization may be detected by using a temperature difference. Once a refrigerant has been sufficiently vaporized (has received a sufficient amount of heat), the refrigerant introduced into the compressor may have a high temperature. Therefore, the refrigerant vaporization may be indirectly checked based on the temperature difference measured in advance when the heat pump system is in a steady state.

A progress rate of the drying process may be indirectly checked through an open degree of the variable expander. Once the drying process has started, the variable expander may be controlled to be open to the maximum such that a sufficient amount of heat is transmitted to sucked air through the condenser. As the drying process is more performed, an open degree of the variable expander may be gradually decreased. Therefore, a progress rate of the drying process may be checked by checking the open degree of the variable expander. Alternatively, a progress rate of the drying process may be checked by detecting a humidity of the exhaust air. More concretely, a progress rate of the drying process may be checked based on the fact that the exhaust air has a high humidity during the initial drying process, but has a low humidity as the drying process is more performed.

Once it is determined that the temperature difference is less than a reference value, it means that the refrigerant vaporization is not sufficient. Therefore, a flow amount of the refrigerant may be deceased by decreasing an open degree of the variable expander. Here, an open degree decrease width may be differently set according to a checked open degree of the variable expander. For instance, an open degree decrease width may be set in proportion to an open degree of the variable expander. This may enhance the energy efficiency, and stably maintain the heat pump system.

Alternatively, a range between a maximum open degree and a minimum open degree of the variable expander may be divided into at least two sections, and an open degree decrease width may be set in correspondence to each section. Here, an open degree decrease width corresponding to a section having a large open degree may be set to be narrower than that corresponding to a section having a small open degree.

As the variable expander, a linear expansion valve (LEV) may be generally used. An open degree of the variable expander may be controlled in proportion to the number of pulses of an applied signal. Therefore, the step of decreasing an open degree of the variable expander implemented as the linear expansion valve (LEV) may include decreasing the number of pulses of a signal applied to the variable expander.

The method may further comprise decreasing the open degree of the variable expander into half or less than when the drying process starts before driving the compressor. This may prevent a large amount of a liquid refrigerant remaining in the evaporator or the compressor after the previous drying process has ended, from being introduced into the compressor. Here, the open degree of the variable expander may be decreased to have a minimum value.

The method may further comprise changing the open degree of the variable expander into a maximum value after driving the compressor for a predetermined time in a state that the open degree has been decreased. This may allow the heat pump system to be driven to the maximum, and thus maximize the amount of waste heat recovered from exhaust air. Here, the predetermined time for which the compressor is driven in a state that the open degree has been decreased may be defined as time taken for the heat pump system to enter a steady state after being driven enough for liquid refrigerant not to exist.

In some cases, the temperature difference (Tci−Tei) between the two measured temperatures may exceed a second value. More concretely, when an excessive amount of heat has been transmitted to the refrigerant from exhaust air through the evaporator, the refrigerant may be over-heated to lower the system efficiency and shorten the lifespan of the compressor. Accordingly, the method may further comprise increasing the open degree of the variable expander such that a temperature of the refrigerant returns to a normal range. In the step of increasing the open degree of the variable expander, an open degree increase width may become variable according to the open degree of the variable expander. An open degree increase width when the open degree is small may be set to be narrower than that when the open degree is large.

A range between a maximum open degree and a minimum open degree of the variable expander may be divided into at least two sections, and an open degree increase width may be set in correspondence to each section. Here, an open degree increase width corresponding to a section having a small open degree may be set to be narrower than that corresponding to a section having a large open degree.

In the step of decreasing the open degree of the variable expander, in a case that an open degree decrease width of the open degree is determined according to a humidity of exhaust air, an open degree decrease width when a detected humidity is low may be set to be narrower than that when a detected humidity is high. A range between a maximum humidity and a minimum humidity of the exhaust air may be divided into at least two sections, and an open degree decrease width may be set in correspondence to each section. Here, an open degree decrease width corresponding to a section having a low humidity may be set to be narrower than that corresponding to a section having a high humidity.

To achieve these and other advantages and in accordance with the purpose of the present invention, as embodied and broadly described herein, there is also provided a clothes treating apparatus, comprising: a drum configured to accommodate therein an object to be dried; an air suction means configured to form a flow path of air introduced into the drum; an air exhaustion means configured to form a flow path of air exhausted from the drum; a condenser disposed to heat air sucked into the drum through the air suction means; an evaporator disposed to cool air exhausted from the drum through the air exhaustion means; a compressor configured to compress a refrigerant introduced from the evaporator; and a variable expander configured to expand a refrigerant introduced from the condenser, and having a variable open degree.

The controller may divide a range between a maximum open degree and a minimum open degree of the variable expander into at least two sections. Here, an open degree change width corresponding to a section having a large open degree may be set to be wider than that corresponding to a section having a small open degree.

To achieve these and other advantages and in accordance with the purpose of the present invention, as embodied and broadly described herein, there is still also provided a clothes treating apparatus, comprising: a drum configured to accommodate therein an object to be dried; an air suction means configured to form a flow path of air introduced into the drum; an air exhaustion means configured to form a flow path of air exhausted from the drum; a condenser disposed to heat air sucked into the drum through the air suction means; an evaporator disposed to cool air exhausted from the drum through the air exhaustion means; a compressor configured to compress a refrigerant introduced from the evaporator; and a variable expander configured to expand a refrigerant introduced from the condenser, and having a variable open degree, the apparatus further comprising first and second temperature detecting means configured to detect temperatures of refrigerants introduced into the compressor and the evaporator, respectively; a humidity detecting means configured to detect a humidity of exhaust air exhausted from the drum; and a controller configured to change an open degree of the variable expander based on a temperature difference between the temperatures detected by the first and second temperature detecting means, wherein the controller is configured to determine an open degree change width based on a humidity detected by the humidity detecting means.

The controller may divide a range between a maximum humidity and a minimum humidity of the exhaust gas into at least two sections. Here, an open degree change width corresponding to a section having a high humidity may be set to be wider than that corresponding to a section having a low humidity.

In the present invention, when the heat pump system is in an abnormal state, the abnormal state may be rapidly detected and the heat pump system may be made to return to a steady state. This may enhance the reliability of the system, and enhance the energy efficiency.

MODES FOR CARRYING OUT THE PREFERRED EMBODIMENTS

Reference will now be made in detail to the preferred embodiments of the present invention, examples of which are illustrated in the accompanying drawings. It will also be apparent to those skilled in the art that various modifications and variations can be made in the present invention without departing from the spirit or scope of the invention. Thus, it is intended that the present invention cover modifications and variations of this invention provided they come within the scope of the appended claims and their equivalents.

Description will now be given in detail of a drain device and a refrigerator having the same according to an embodiment, with reference to the accompanying drawings.

Hereinafter, a clothes treating apparatus having a heat pump, and an operating method thereof according to the present invention will be explained in more details with reference to the attached drawings.

Figure 1:
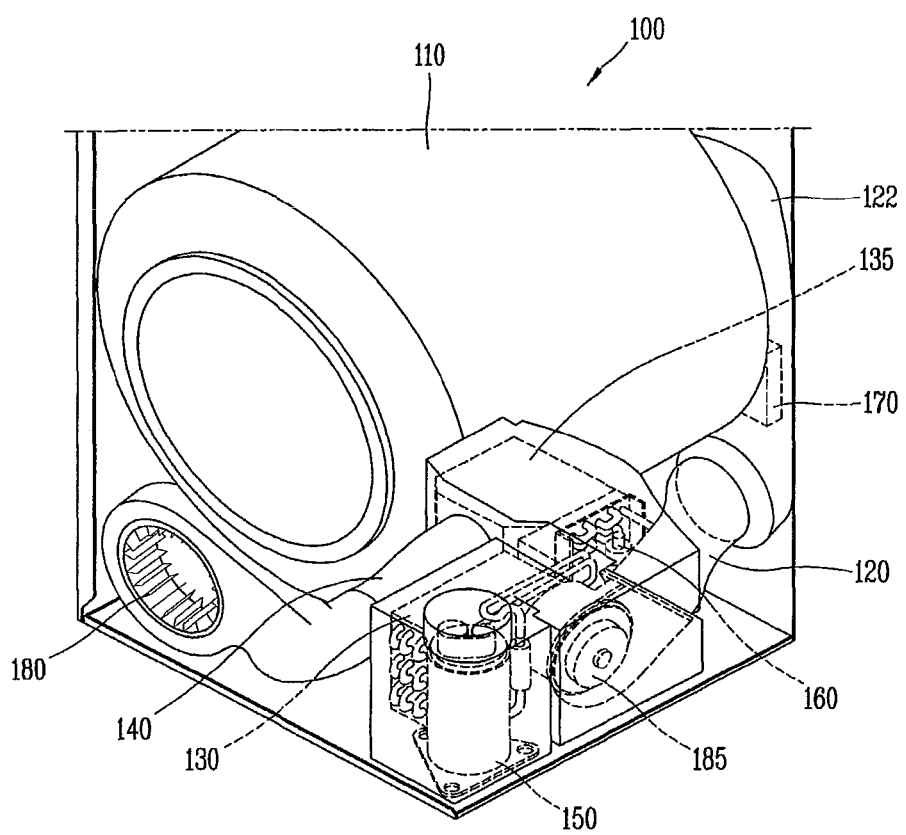
FIG. 1 is a perspective view schematically illustrating an inner structure of a clothes treating apparatus according to one embodiment of the present invention.
Figure 2:
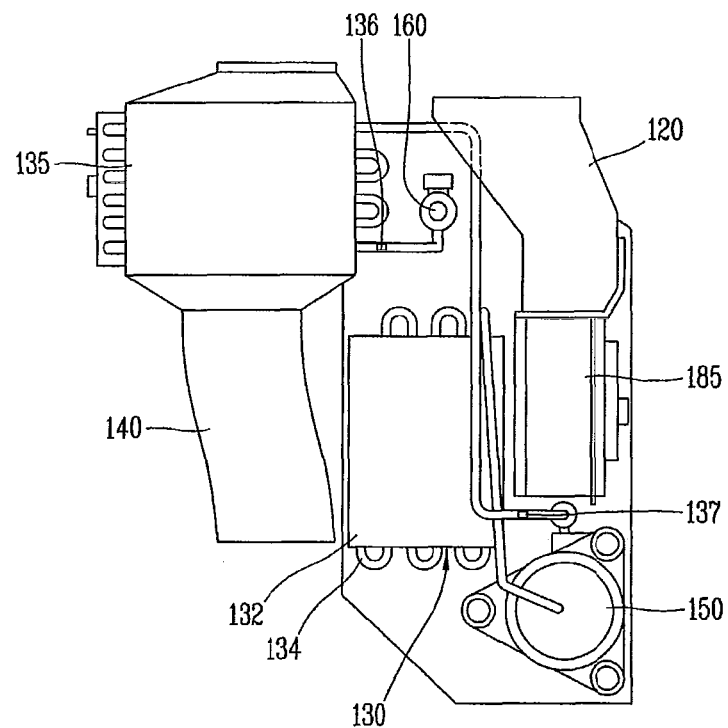
FIG. 2 is a planar view of the clothes treating apparatus of FIG. 1.

FIG. 1 is a perspective view schematically illustrating an inner structure of a clothes treating apparatus according to one embodiment of the present invention, and FIG. 2 is a planar view of the clothes treating apparatus of FIG. 1. Referring to FIGS. 1 and 2, FIG. 1 illustrates a clothes dryer as a clothes treating apparatus. However, the present invention is not limited to the clothes treating apparatus, but is applicable to any clothes treating apparatuses for drying laundry by supplying hot air into a drum, e.g., a washing machine having a drying function, etc. The clothes treating apparatus according to the present invention comprises a body 100 which forms the appearance of a clothes dryer, and a drum 110 rotatably installed in the body. The drum is rotatably supported by a supporter (not shown) at front and rear sides.

An air suction duct 120 which forms part of an air suction flow path toward inside of the drum 110 is installed at a bottom surface of the drum 110, and the end of the air suction duct 120 is connected to the end of a backduct 122. The backduct 122 is extending to an up-down direction of the body 100 between the air suction duct 120 and the drum 110, thereby introducing air having passed through the air suction duct 120 into the drum 110. Accordingly, formed is an air suction flow path through which air is introduced into the drum 110 by the air suction duct 120 and the backduct 122.

Air supplied through the air suction flow path is introduced into the body through an air suction port (not shown) formed on a rear surface or a bottom surface of the body, and then is transferred to the air suction duct 120. For this transfer of the air, an air suction fan 185 is installed at the end of the air suction duct 120. That is, air inside the body is introduced into the air suction duct 120 by rotation of the air suction fan 185. This may lower a pressure inside the body, thereby causing external air to be introduced into the body through the air suction port.

A condenser 130 is installed at a front side of the air suction fan (upper stream side based on an air flow path). The condenser 130 constitutes a heat pump together with an evaporator 135, a compressor 150 and an expander 160 to be later explained. One refrigerant pipe 134 is arranged in a zigzag form, and radiation fins 132 are installed on the surface of the refrigerant pipe 134. Since the air suction fan 185 is positioned at a down stream side of the condenser 130, air sucked by the air suction fan 185 is heat-exchanged with a refrigerant with contacting the radiation fins 132 of the condenser 130. Then, the air is introduced into the drum in a state of an increased temperature. As the variable expander 160, used is a linear expansion valve (LEV) of which open degree is controlled by an electric signal.

A heater 170 is installed in the backduct 122 so as to additionally heat air having not been sufficiently heated by the condenser 103. The heater 170 may be installed at the air suction duct 120. This air heated while passing through the condenser 130 and the heater is introduced into the drum in the form of hot air, and then serves to dry an object to be dried and accommodated in the drum.

Then, the hot air is exhausted to an exhaust air duct 140 by an exhaust air fan 180 positioned below the drum 110, and then is heat-exchanged with a low-temperature refrigerant passing through inside of the evaporator 135 disposed at the end of the exhaust air duct 140. Then, the air is exhausted to outside of the body 100. Through these heat exchange processes, the air is exhausted to outside of the body 100 in a state of lowered temperature and humidity. Part of thermal energy of the exhaust air is transmitted to the refrigerant through the evaporator 135, and is re-transmitted to sucked air through the condenser. That is, thermal energy of the exhaust air is collected to be reused to generate hot air. This may reduce the amount of energy consumption.

If a sufficient amount of heat is not acquired from the evaporator 135, part of a refrigerant discharged from the evaporator is introduced into the compressor 150 in a liquid state. Once the liquid refrigerant is introduced into the compressor 150, the compressor may be damaged or may have lowered energy efficiency. Accordingly, a temperature difference of the refrigerant having passed through the evaporator 135 is detected to indirectly check a dry state of the refrigerant. In the preferred embodiment, a first temperature sensor 136 is provided at an inlet side of the evaporator 135, and a second temperature sensor 137 is provided at an inlet side of the compressor (refer to FIG. 2).

If the refrigerant acquires a sufficient amount of heat from the evaporator 135, a temperature difference of the refrigerant between front and rear sides of the evaporator 135, i.e., T2-T1 (when it is assumed that an inlet side temperature of the evaporator is T1, and an inlet side temperature of the compressor 150 is T2) has a value more than a predetermined value (first value). The first value is defined as a minimum value when the heat pump system normally operates.

On the other hand, if the refrigerant acquires an excessive amount of heat from the evaporator 135, the temperature difference of the refrigerant (T2-T1) is not within the normal range. In this case, the value (T2-T1) exceeds a second value defined as a maximum value when the heat pump system normally operates.

In the case that the value (T2-T1) is not within the normal range between the first value and the second value, an open degree of the variable expander 160 is controlled to change a flow amount of the refrigerant and to change the value (T2-T1).

Figure 3:
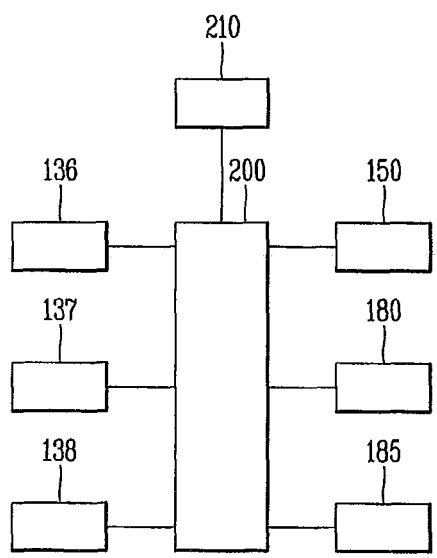
FIG. 3 is a block diagram schematically illustrating a configuration of a controller of the clothes treating apparatus of FIG. 1.

FIG. 3 is a block diagram schematically illustrating a configuration of the controller 200 of the clothes treating apparatus of FIG. 1. Referring to FIG. 3, the controller 200 provided at any position of the body 100 is electrically connected to the two temperature detecting sensors 136 and 137, and receives a detection signal, thereby checking whether the heat pump system normally operates based on the value (T2-T1). If it is determined that the heat pump system does not normally operate, an open degree of the variable expander 160 is controlled to allow the heat pump system to be in a steady state.

The reference numeral 138 denotes a humidity sensor installed on an exhaust air duct through which air exhausted from the drum passes. The operation of the humidity sensor 138 will be explained later.

Figure 4:
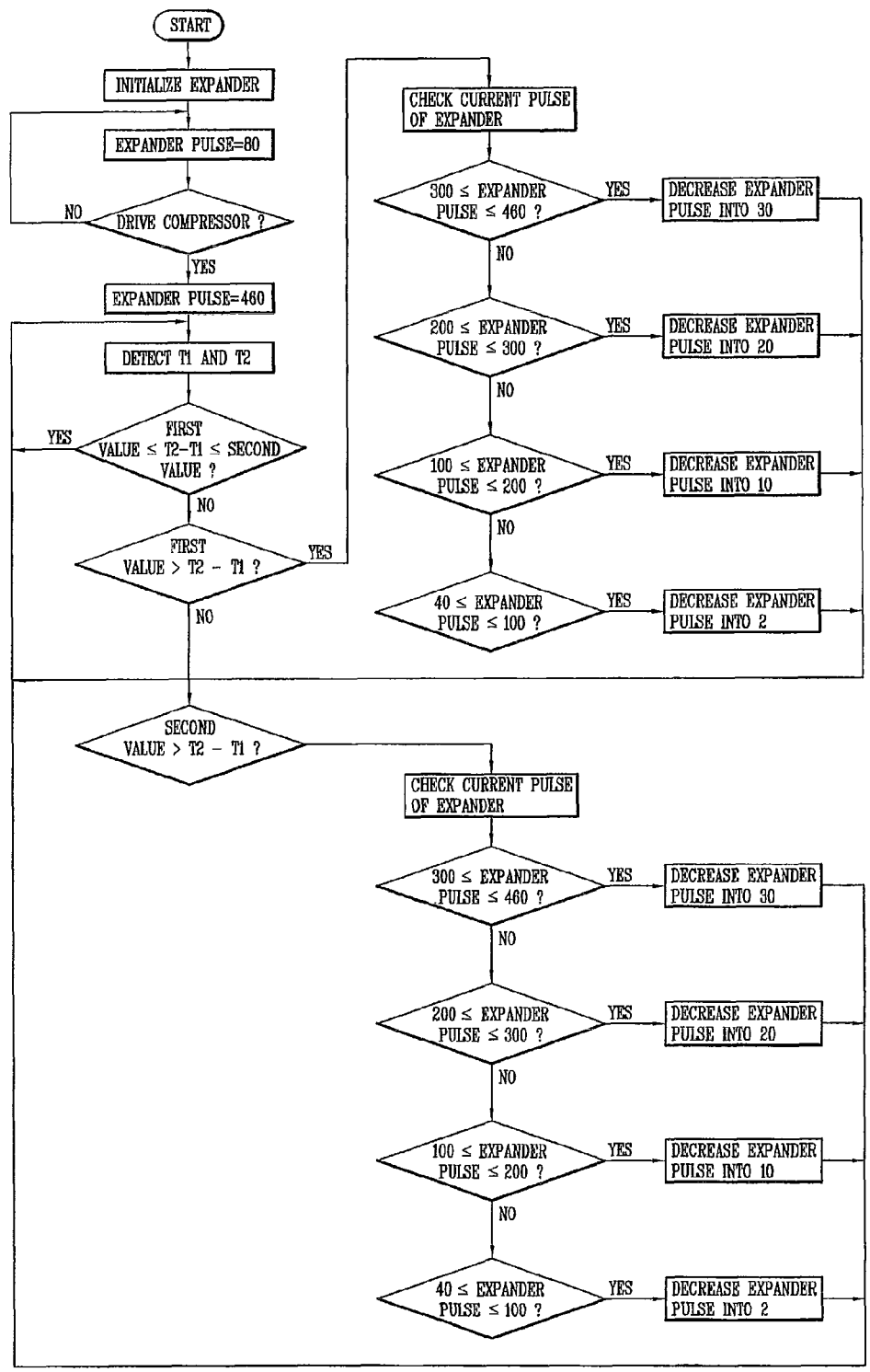
FIG. 4 is a flowchart illustrating processes of controlling an open degree of a variable expander.

With reference to FIG. 4, will be explained processes of controlling an open degree of the variable expander 160 by the controller. Referring to FIG. 4, once a drying process starts, the controller 200 initializes the variable expander 160, and then sets a pulse of a signal applied to the variable expander 160 as 'a'. Here, the value 'a' indicates a value corresponding to the half or less than the number of pulses applied to the variable expander when the variable expander 160 is open to the maximum, which is set as 80 in the preferred embodiment. The reason why the open degree of the variable expander 160 is initially decreased is in order to prevent a large amount of liquid refrigerant remaining on the condenser or the evaporator during the previous drying process from being introduced into the compressor 150.

Then, it is checked whether the compressor 150 is operating or not. If it is determined that the compressor 150 is in an non-operation state, the valve of the variable expander is maintained as it is. On the other hand, if it is determined that the compressor 150 is in an operation state, the open degree of the variable expander is maximized. For this, the maximum number of pulses of a signal applied to the variable expander is set as 460. Here, the maximum number of pulses is merely exemplary, and may be variable according to a type and specifications of a used expander.

After setting the maximum number of pulses, T1 and T2 are detected by the two temperature sensors. Then, T2-T1 is calculated based on the detected T1 and T2. If the value (T2-T1) is between a predetermined first value and a predetermine second value, the controller determines that the heat pump system is in a steady state. Then, the controller repeatedly detects the values, T1 and T2.

If the temperature difference is less than the first value, it means that a sufficient amount of heat is not supplied from the evaporator and thus the refrigerant is introduced into the compressor in a liquid state. Accordingly, the open degree of the variable expander is decreased to reduce a flow amount of the refrigerant. Here, the controller checks the number of pulses of a signal applied to the variable expander, and differently sets an open degree decrease width of the variable expander according to the checked number of pulses.

More concretely, the controller divides the range between the maximum value (460) and the minimum value (40) of the number of pulses of the variable expander into the following 4 sections.

First section: 300~460,
Second section: 200~300,
Third section: 100~200,
Fourth section: 40~100

Exhaust air exhausted from the drum contains a large amount of moisture during the initial stage of the drying process. Accordingly, latent heat-type of thermal energy is higher than sensible heat-type of thermal energy. This may cause thermal transfer not to be easily implemented. In the case that it is determined that the value (T2-T1) is less than the first value during the initial stage of the drying process, the variable expander has to have a wide open degree decrease width so that the quantity of state of the refrigerant can be controlled into a proper level. On the contrary, as the drying process is performed, the amount of moisture included in exhaust air becomes small. As a result, the amount of sensible heat-type of energy is increased. In this case, the open degree decease width of the variable expander is relatively narrowed to control the quantity of state of the refrigerant to a sufficient level.

In the aspect of a change of the quantity of state of the refrigerant, it is advantageous to increase an open degree decrease width. However, if the flow amount of the refrigerant is decreased, it is not preferable in the aspect of the energy efficiency since the amount of waste heat recovered from the evaporator is also decreased. Accordingly, in order to rapidly change the quantity of state of the refrigerant in a state that the decrease width of the energy efficiency is minimized, a decrease width of the flow amount of the refrigerant has to be determined based on a checked progress rate (progress degree) of the drying process.

Figure 5:
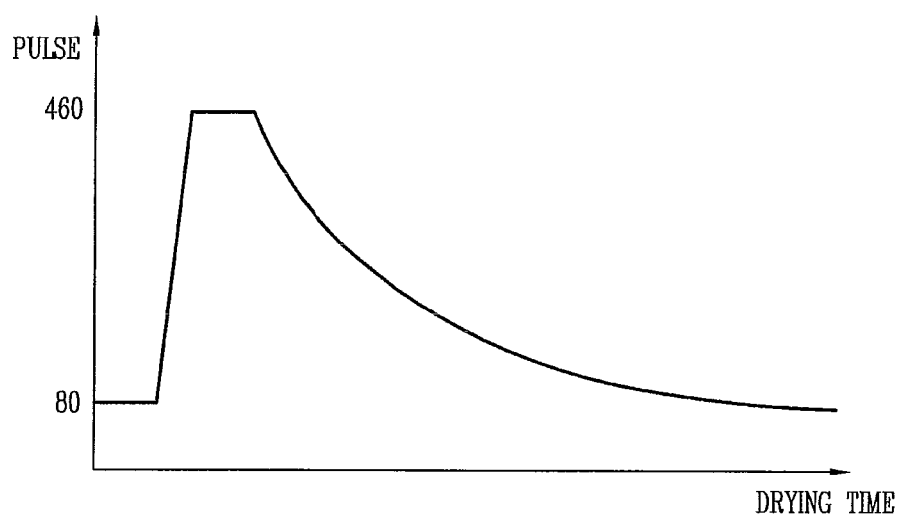
FIG. 5 is a graph illustrating a change of an open degree of a variable expander, the open degree controlled by the processes shown in FIG. 4.

FIG. 5 is a graph illustrating a change of an open degree of a variable expander according to a progress rate of a drying process. As shown in FIG. 5, the first section among the four sections corresponds to the initial stage of the drying process, and the fourth section corresponds to the final stage of the drying process. Therefore, at the first section, a pulse decrease width of a signal applied to the variable expander is set as 30, a relatively large value. However, as the drying process is performed, the pulse decrease width is decreased to be set as 2.

After decreasing the open degree of the variable expander, the controller repeatedly detects the values, T1 and T2.

In the case that the value (T2−T1) exceeds the second value, the number of pulses of a signal applied to the variable expander is increased as shown in FIG. 5.

In the case that the value (T2−T1) is not within a normal range in spite of controls of the open degree of the variable expander, it is determined that problems have occurred on the apparatus. Accordingly, an abnormal state of the apparatus is informed to a user through a display 210 provided at a manipulation panel (not shown).

Alternatively, a sump heater for heating oil may be provided at the compressor. The sump heater indicates a heater for heating oil stored in the compressor, and is implemented to obtain an oil viscosity proper to operate the compressor by heating oil during the initial stage of the compressor. In order to control the operation of the sump heater, a third temperature sensor may be installed at a discharge side of the compressor so as to detect a temperature of the refrigerant discharged from the compressor. Based on the detected temperature, the operation of the sump heater may be controlled.

An operation state of the heat pump may be influenced by the peripheral circumstances of a place where the clothes treating apparatus has been installed. Accordingly, temperature measurements may be executed with consideration of the peripheral circumstances. For this, an additional temperature sensor for measuring the peripheral temperature may be additionally installed, and values measured by the first to third temperature sensors may be properly processed to be utilized for control of the apparatus.

The drying process may be determined based on a humidity of exhaust air exhausted from the drum, not based on the open degree of the variable expander. The humidity sensor 138 serves to measure humidity of air exhausted from the drum, thereby checking a progress rate of the drying process. A humidity range of exhaust air during the drying process may be divided into 4 sections, and each section may be set to have a different pulse decrease width.

Either the temperature sensors 136 and 137, or the humidity sensor 138 may be implemented, or both of them may be implemented. In the latter case, the temperature sensors may be used to check a progress rate of the drying process, and the humidity sensor may be used only when the temperature sensor abnormally operates. Alternatively, the temperature sensors and the humidity sensor may be entirely used to check a progress rate of the drying process, respectively. After comparing the results obtained when respectively using the two sensors with each other, the open degree of the variable expander may be controlled based on a comparison result.

The invention claimed is:

1. A method for operating a clothes treating apparatus comprising:
   a drum configured to accommodate therein an object to be dried;
   an air suction means configured to form a flow path of air introduced into the drum;
   an air exhaustion means configured to form a flow path of air exhausted from the drum;
   a condenser disposed to heat air sucked into the drum through the air suction means;
   an evaporator disposed to cool air exhausted from the drum through the air exhaustion means;
   a compressor configured to compress a refrigerant introduced from the evaporator; and
   a variable expander configured to expand a refrigerant introduced from the condenser, and having a variable open degree,
   the method comprising:
   measuring a temperature (Tei) of a refrigerant introduced into the evaporator, and a temperature (Tci) of a refrigerant introduced into the compressor; and
   decreasing an open degree of the variable expander when a temperature difference (Tci−Tei) between the two measured temperatures is less than a predetermined first value, wherein in the step of decreasing the open degree of the variable expander, an open degree decrease width when the open degree is small is set to be narrower than that when the open degree is large.

2. The method of claim 1, wherein a range between a maximum open degree and a minimum open degree of the variable expander is divided into at least two sections, and an open degree decrease width is set in correspondence to each section, wherein an open degree decrease width corresponding to a section having a large open degree is set to be narrower than that corresponding to a section having a small open degree.

3. The method of claim 1, further comprising decreasing the open degree of the variable expander into half or less than when the drying process starts before driving the compressor.

4. The method of claim 3, wherein the open degree of the variable expander has a minimum value before the compressor is driven.

5. The method of claim 3, further comprising changing the open degree of the variable expander into a maximum value after driving the compressor.

6. The method of claim 1, further comprising increasing the open degree of the variable expander when a temperature difference (Tci−Tei) between the two measured temperatures exceeds a predetermined second value,
   wherein in the step of increasing the open degree of the variable expander, an open degree increase width when the open degree is small is set to be narrower than that when the open degree is large.

7. The method of claim 6, wherein a range of a maximum open degree and a minimum open degree of the variable expander is divided into at least two sections, and an open degree increase width is set in correspondence to each section, wherein an open degree increase width corresponding to a section having a small open degree is set to be narrower than that corresponding to a section having a large open degree.

8. A method for operating a clothes treating apparatus comprising:
a drum configured to accommodate therein an object to be dried;
an air suction means configured to form a flow path of air introduced into the drum;
an air exhaustion means configured to form a flow path of air exhausted from the drum;
a condenser disposed to heat air sucked into the drum through the air suction means;
an evaporator disposed to cool air exhausted from the drum through the air exhaustion means;
a compressor configured to compress a refrigerant introduced from the evaporator; and
a variable expander configured to expand a refrigerant introduced from the condenser, and having a variable open degree,
the method comprising:
detecting a humidity of exhaust air exhausted from the drum; and
decreasing the open degree of the variable expander according to the detected humidity of the exhaust air,
wherein in the step of decreasing the open degree of the variable expander, an open degree decrease width when the detected humidity is low is set to be narrower than that when the detected humidity is high.

9. The method of claim 8, wherein a range between a maximum humidity and a minimum humidity of the exhaust air is divided into at least two sections, and an open degree decrease width is set in correspondence to each section, wherein an open degree decrease width corresponding to a section having a low humidity is set to be narrower than that corresponding to a section having a high humidity.

10. The method of claim 8, further comprising decreasing the open degree of the variable expander into half or less than when a drying process starts before driving the compressor.

11. The method of claim 10, wherein the open degree of the variable expander has a minimum value before the compressor is driven.

12. The method of claim 11, further comprising changing the open degree of the variable expander into a maximum value after driving the compressor.

13. A clothes treating apparatus, comprising:
a drum configured to accommodate therein an object to be dried;
an air suction means configured to form a flow path of air introduced into the drum;
an air exhaustion means configured to form a flow path of air exhausted from the drum;
a condenser disposed to heat air sucked into the drum through the air suction means;
an evaporator disposed to cool air exhausted from the drum through the air exhaustion means;
a compressor configured to compress a refrigerant introduced from the evaporator; and
a variable expander configured to expand a refrigerant introduced from the condenser, and having a variable open degree;
the apparatus further comprising:
first and second temperature detecting means configured to detect temperatures of refrigerants introduced into the compressor and the evaporator, respectively; and
a controller configured to change an open degree of the variable expander based on a temperature difference between the temperatures detected by the first and second temperature detecting means,
wherein the controller is configured to determine an open degree change width based on a current open degree of the variable expander.

14. The clothes treating apparatus of claim 13, wherein the controller divides a range between a maximum open degree and a minimum open degree of the variable expander into at least two sections, and
an open degree change width corresponding to a section having a large open degree is set to be wider than that corresponding to a section having a small open degree.

15. A clothes treating apparatus, comprising:
a drum configured to accommodate therein an object to be dried;
an air suction means configured to form a flow path of air introduced into the drum;
an air exhaustion means configured to form a flow path of air exhausted from the drum;
a condenser disposed to heat air sucked into the drum through the air suction means;
an evaporator disposed to cool air exhausted from the drum through the air exhaustion means;
a compressor configured to compress a refrigerant introduced from the evaporator; and
a variable expander configured to expand a refrigerant introduced from the condenser, and having a variable open degree;
the apparatus further comprising:
a humidity detecting means configured to detect a humidity of exhaust air exhausted from the drum; and
a controller configured to change an open degree of the variable expander based on a humidity detected by the humidity detecting means,
wherein the controller is configured to differently determine an open degree change width based on a humidity detected by the humidity detecting means.

16. The clothes treating apparatus of claim 15, wherein the controller divides a range between a maximum humidity and a minimum humidity of the exhaust gas into at least two sections, and
an open degree change width corresponding to a section having a high humidity is set to be wider than that corresponding to a section having a low humidity.

17. A method for operating a clothes treating apparatus comprising:
a drum configured to accommodate therein an object to be dried;
an air suction means configured to form a flow path of air introduced into the drum;
an air exhaustion means configured to form a flow path of air exhausted from the drum;
a condenser disposed to heat air sucked into the drum through the air suction means;
an evaporator disposed to cool air exhausted from the drum through the air exhaustion means;
a compressor configured to compress a refrigerant introduced from the evaporator; and
a variable expander configured to expand a refrigerant introduced from the condenser, and having a variable open degree,
the method comprising:
measuring time for which a drying process has been performed; and decreasing the open degree of the variable expander as the drying process is performed according to lapsed time,
wherein in the step of decreasing the open degree of the variable expander, an open degree decrease width is set to become narrower as time lapses.

18. The method of claim 17, wherein a section for the drying process is divided into at least two sections according to lapses of time, and an open degree decrease width is set in correspondence to each section,
wherein an open degree decrease width corresponding to the section is set to be narrower as lapses of time.

19. The method of claim 17, further comprising decreasing the open degree of the variable expander into half or less than when the drying process starts before driving the compressor.

20. The method of claim 17, further comprising changing the open degree of the variable expander into a maximum value after driving the compressor.

* * * * *